US 9,342,086 B2

(12) United States Patent
Houston et al.

(10) Patent No.: US 9,342,086 B2
(45) Date of Patent: May 17, 2016

(54) CURRENT MODE CONTROL MODULATOR WITH COMBINED CONTROL SIGNALS AND IMPROVED DYNAMIC RANGE

(71) Applicant: INTERSIL AMERICANS LLC, Milpitas, CA (US)

(72) Inventors: M. Jason Houston, Cary, NC (US); Steven P. Laur, Raleigh, NC (US); Rhys S. A. Philbrick, San Jose, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 42 days.

(21) Appl. No.: 14/570,004

(22) Filed: Dec. 15, 2014

(65) Prior Publication Data
US 2016/0062375 A1 Mar. 3, 2016

Related U.S. Application Data

(60) Provisional application No. 62/042,452, filed on Aug. 27, 2014.

(51) Int. Cl.
*H02M 3/156* (2006.01)
*G05F 1/56* (2006.01)

(52) U.S. Cl.
CPC .................................. *G05F 1/56* (2013.01)

(58) Field of Classification Search
CPC ... H02M 3/156; H02M 3/1563; H02M 3/158; H02M 3/1588; H02M 2001/0025; Y02B 70/1466
USPC .................................. 323/282, 284, 285, 288
See application file for complete search history.

(56) References Cited

U.S. PATENT DOCUMENTS

| | | | | |
|---|---|---|---|---|
| 6,791,306 B2* | 9/2004 | Walters | .......... | H02M 3/156 323/282 |
| 7,071,630 B1* | 7/2006 | York | .......... | H05B 33/0815 315/224 |
| 8,823,352 B2* | 9/2014 | Zhang | .......... | H02M 1/14 323/271 |
| 2014/0266110 A1* | 9/2014 | Yuan | .......... | H02M 3/156 323/282 |
| 2016/0006336 A1* | 1/2016 | Bennett | .......... | H02M 1/00 323/271 |

OTHER PUBLICATIONS

Vidal-Idiarte, Enric et al. "An H ∞ Control Strategy for Switching Converters in Sliding-Mode Current Control" *IEEE Transactions on Power Electronics*, vol. 21, No. 2, Mar. 2006 pp. 553-556.

* cited by examiner

*Primary Examiner* — Gary L Laxton
(74) *Attorney, Agent, or Firm* — Gary Stanford; Huffman Law Group, PC

(57) ABSTRACT

A modulator for controlling a switch circuit of a voltage regulator, including a sense circuit that provides a current sense signal indicative of current through the output inductor, a ramp circuit that develops a ramp voltage on a ramp node using the current sense signal, an error circuit that develops an error signal indicative of output voltage error and that injects the error signal into the ramp node to adjust the ramp voltage, a comparator circuit that compares the ramp voltage with a fixed control voltage to develop a compare signal, and a logic circuit that uses the compare signal to develop a pulse control signal that controls the switch circuit. The output voltage error may be determined by comparing the output voltage with a reference voltage and converting the error voltage to a current applied to the ramp node.

20 Claims, 3 Drawing Sheets

CURRENT MODE CONTROL MODULATOR WITH COMBINED CONTROL SIGNALS AND IMPROVED DYNAMIC RANGE

CROSS-REFERENCE TO RELATED APPLICATIONS

This application claims the benefit of U.S. Provisional Application Ser. No. 62/042,452, filed on Aug. 27, 2014 which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

Voltage regulators have several different control schemes, including voltage mode control and current mode control. In various voltage mode control schemes, a fixed ramp (or fixed range with fixed or variable slope) is compared to a control signal. The ramp and control signals are generally well contained and the output current (or inductor current) may have a relatively large range. In various current mode control schemes, a variable ramp proportional to the inductor current is compared to the control signal. In the current mode control scheme, the control signal and the ramp are proportional to the inductor current. In this manner, the range of the inductor current is related to the range of the control signal. Thus, signal dynamic range is a consideration in implementing current mode control, and performance may be reduced and flexibility may be limited by constraints on the range of key signals.

In many cases, current mode control is preferable to voltage mode control for voltage regulators. Signal range, however, is an important consideration in the current mode control schemes. Gain may be scaled, but such tends to cause performance trade-offs. Parameters that impact signal range also impact system stability, gain, and dynamic performance. As supply voltages (e.g., VDD to GND or VSS) continue to drop, signal range becomes an increasingly important consideration. It is desired to provide a high performance current mode pulse width modulation (PWM) regulator with minimal required signal range.

Figure 1:
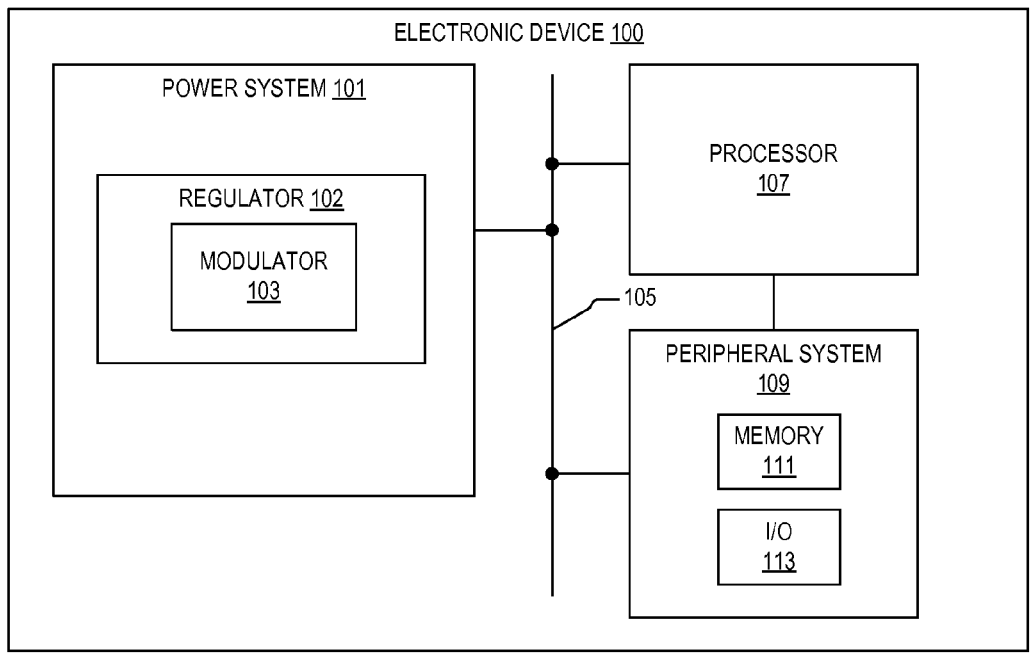
FIG. 1 is a simplified block diagram of a computer system configured with a power supply including a modulator implemented according to an embodiment of the present invention for controlling a voltage regulator.

FIG. 1 is a simplified block diagram of a computer system 100 configured with a power supply 101 including a modulator 103 implemented according to an embodiment of the present invention for controlling a voltage regulator 103. The power supply 101 develops one or more supply voltages which provide power to other system devices of the computer system 100 via a connection system 105. The connection system 105 may be a bus system or switch system or a set of conductors or the like. In the illustrated embodiment, the computer system 100 includes a processor 107 and a peripheral system 109 both coupled to the connection system 105 to receive supply voltages from the power supply 101. In the illustrated embodiment, the peripheral system 109 may include any combination of a system memory 111 (e.g., including any combination of RAM (random access) and ROM (read only) memory type devices and memory controllers and the like), and an input/output (I/O) system 113, which may include system controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

The electronic device 100 may be any type of computer or computing device, such as a computer system (e.g., notebook computer, desktop computer, netbook computer, etc.), a media tablet device (e.g., iPad by Apple Inc., Kindle by Amazon.com, Inc., etc.), a communication device (e.g., cellular phone, smartphone, etc.), among other type of electronic devices (e.g., media player, recording device, etc.). The power system 101 may be configured to include a battery (rechargeable or non-rechargeable) and/or may be configured to operate with an alternating current (AC) adapter or the like. The present invention is applicable to any type of computing device for different applications.

Figure 2:
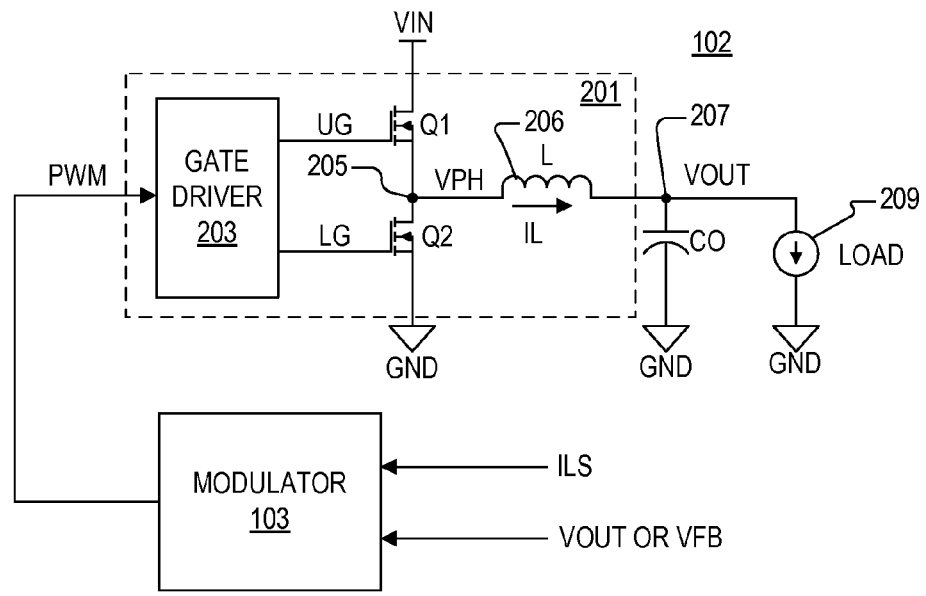
FIG. 2 is a simplified schematic and block diagram of an exemplary buck-type regulator including the modulator of FIG. 1 implemented according to one embodiment of the present invention.

FIG. 2 is a simplified schematic and block diagram of an exemplary buck-type regulator 102 including the modulator 103 implemented according to one embodiment of the present invention. The regulator 102 includes a phase circuit 201 which may be implemented for a single phase system or a multiphase system. The phase circuit 201 includes a gate driver 203 receiving a pulse width modulation (PWM) signal and providing switch control signals to control switching of the phase circuit 201. As shown, the gate driver 203 provides an upper gate signal UG to an upper electronic power switch Q1 and a lower gate signal LG to a lower electronic power switch Q2. The power switches Q1 and Q2 have their current terminals (e.g., drains and sources) coupled series between an input voltage VIN and a common reference voltage GND (e.g., in which GND represents ground or any other suitable positive or negative reference voltage level). It is noted that GND may represent one or more reference nodes, including one or more ground levels or nodes, such as signal ground, power ground, chassis ground, etc., or any other suitable reference voltage level.

The switches Q1 and Q2 are coupled together at an intermediate phase node 205 developing a phase voltage VPH, and an output inductor 206 with inductance L having one end coupled to the phase node 205 and its other end coupled to an output node 207 developing an output voltage VOUT. During operation, an inductor current IL flows through the output inductor 206. An output capacitor CO and a load 209 are coupled between the output node 207 and GND. The load 209 represents any one or more of the load devices, such as the processor 107 and/or any of devices of the peripheral system 109. In an alternative embodiment, the low side switch Q2 may be replaced by a diode according to a non-synchronous buck regulator topology. The output capacitor CO may be implemented with one or more electrolytic-type capacitors or all-ceramic type capacitors or the like.

The modulator 103 receives a voltage indicative of the output voltage VOUT, which may be VOUT itself or another sense signal, such as a feedback signal VFB indicative of VOUT. VFB may be a sensed or proportional signal indicative of VOUT, such as developed by a voltage divider or the like (not shown). The modulator 103 also receives a current sense signal ILS indicative of the inductor current IL. The inductor current IL may be sensed, simulated or otherwise synthesized and the corresponding inductor current sense signal ILS is provided to a modulator 103. Also not explicitly shown is a series DC resistance (DCR) of the output inductor 206, which may be used for sensing the current IL. The modulator 103 uses ILS and VOUT (or VFB) and generates the PWM signal for controlling the phase circuit 201. In operation, the modulator 103 uses VFB (or VOUT) and ILS and possibly other sensed signals or parameters and generates the PWM signal for purposes of loop regulation among other functions. The gate driver 203 generates UG and LG based on the duty cycle of PWM to turn on and off the electronic switches Q1 and Q2 to regulate the voltage level of VOUT.

Figure 3:
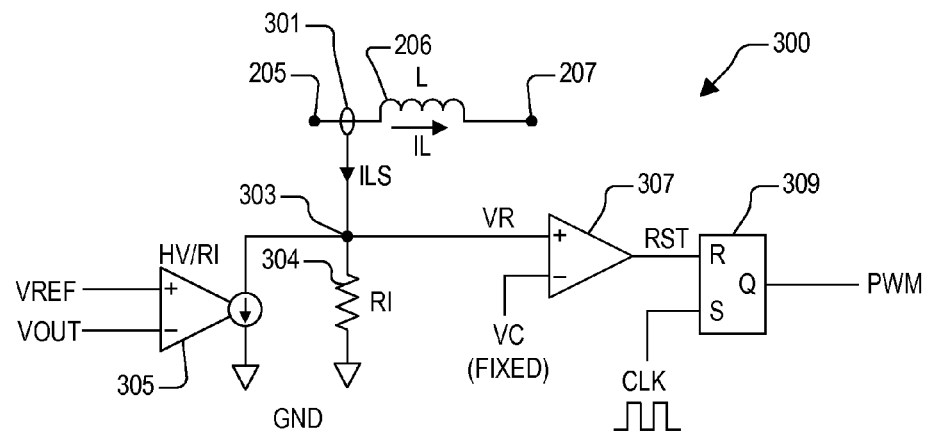
FIG. 3 is a simplified schematic diagram of a current mode control modulator with combined control signals according to one embodiment which may be used as the modulator for controlling operation of the regulator of FIG. 1.

FIG. 3 is a simplified schematic diagram of a current mode control modulator 300 with combined control signals according to one embodiment which may be used as the modulator 103 for controlling operation of the regulator 102. The modulator 300 includes similar features of conventional current mode control, but is modified to achieve the improvements described herein. A ramp voltage VR is at least partially developed on a ramp node 303 by applying the sensed inductor current signal ILS measured by current sensor 301 to a resistor 304 with resistance RI coupled between the ramp node 303 and GND (which may be reference supply voltage VSS for semiconductor chip configuration). In addition, the output voltage error based on VREF-VOUT is injected onto the current sense ramp VR at the ramp node 303 to adjust VR. VREF is provided to a positive (or non-inverting) input of a transconductance amplifier 305 with gain HV/RI, which receives VOUT (or VFB) at its negative (or inverting) input. The output of the transconductance amplifier 305 develops a current applied between the ramp node and GND to adjust VR. The adjusted VR is compared to a fixed control voltage VC by a comparator 307, having its output providing a reset signal RST to a reset (R) input of a set-reset (SR) latch 309. The set (S) input of the SR latch 309 receives a clock signal CLK, and its Q output provides the pulse control signal PWM.

In operation of the current mode control modulator 300, CLK sets the SR latch 309 to pull PWM high. The inductor current IL increases so that ILS increases causing VR to ramp upwards. The ramp voltage VR is adjusted by the output voltage error provided by the error circuit implemented with the transconductance amplifier 305. When VR rises above VC, the comparator 307 switches to assert RST so that the SR latch 309 pulls PWM back low. Operation repeats for successive switching cycles.

In the current mode control of the voltage regulator 102 using the current mode control modulator 300, the PWM signal is developed using VR and VC. For the voltage regulator 102, the difference between VR and VC may be provided according to the following equation (1):

$$VR-VC=IL(RI)-(VREF-VOUT)(HV) \quad (1)$$

in which VR is developed using the inductor current IL (sensed by ILS) and the resistance RI, and modified by the transconductance amplifier 305 developing an adjust current based on the difference between VREF and VOUT multiplied by the amplifier gain HV. The right side of equation (1) may be rewritten according to the following expression (2):

$$\left[ILS - \frac{(VREF - VOUT)(HV)}{RI}\right]RI \quad (2)$$

The current mode control modulator 300 is configured according to the expression (2). The inductor current IL (or ILS) multiplied by RI develops a ramp voltage in a similar manner as in a conventional configuration. The transconductance amplifier 305, however, amplifies the difference between VREF and VOUT by a gain HV/RI, or (VREF−VOUT)(HV/RI), to adjust VR. The amplifier 305 provides the adjust current in the second portion within the brackets of equation (2). This adjust current is multiplied by RI to modify VR developed on the ramp node 303 by injecting output voltage error information.

In this manner, the current mode control modulator 300 employs a control method such that regulator behavior operates in an equivalent manner as that of a conventional current mode controller. The current mode control modulator 300, however, is not limited by the signal range constraints, so that load transient response is improved, noise tolerance is increased, and integrated and adjustable compensation may be facilitated.

Figure 4:
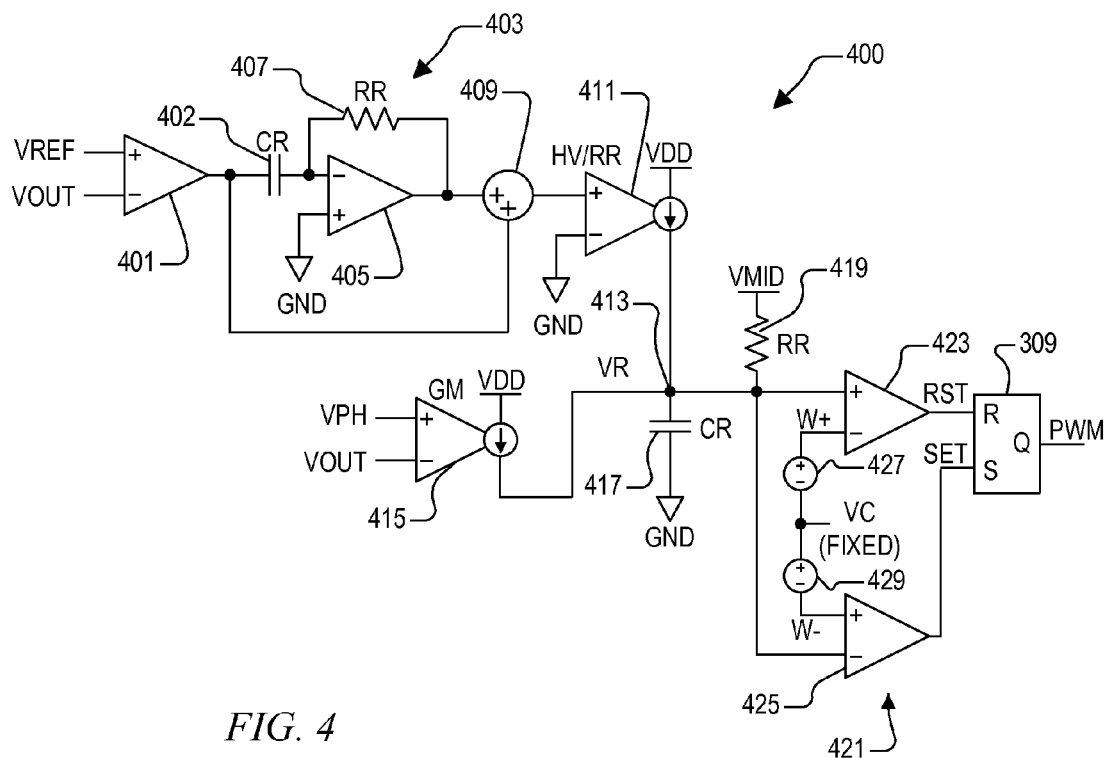
FIG. 4 is a simplified schematic diagram of a synthetic ripple current mode control modulator with combined control signals according to one embodiment which may be used as the modulator for controlling operation of the regulator of FIG. 1.

FIG. 4 is a simplified schematic diagram of a synthetic ripple current mode control modulator 400 with combined control signals according to one embodiment which may be used as the modulator 103 for controlling operation of the regulator 102. A transconductance amplifier 415 with a transconductance gain GM has a positive input receiving the phase voltage VPH, a negative input receiving VOUT (or a voltage indicative of VOUT), and an output coupled to a ramp node 413 developing ramp voltage VR. In this case, the ramp voltage VR may be referred to as a ripple node 413 developing ripple voltage VR for the synthetic ripple configuration. A ripple capacitor 417 with ripple capacitance CR is coupled between the ripple node 413 and GND. A ripple resistor 419 with ripple resistance RR is coupled between the ripple node 413 and a midpoint voltage VMID (reference or bias voltage).

A hysteretic comparator 421 is used similar to the conventional configuration except using a fixed window voltage based on the fixed control voltage VC. The hysteretic comparator 421 includes a first comparator 423 and a second comparator 425. The ripple node 413 is coupled to the positive input of the first comparator 423, having its negative input receiving a positive window voltage W+. The ripple node 413 is also coupled to the negative input of the second comparator 425, having its positive input receiving a negative window voltage W−. A first voltage source 427 has its negative terminal receiving the fixed control voltage VC, and its positive terminal providing W+. A second voltage source 429 has its positive terminal receiving the fixed control voltage VC, and its negative terminal providing W−. Generally, the voltage of the voltage sources 427 and 429 are the same so that W+ is above VC by the same voltage that W− is below VC. The output of the first comparator 423 provides the RST signal to the reset input of the SR latch 309, and the output of the second comparator 425 provides a set signal SET to the set input of the SR latch 309. The Q output of the SR latch 309 provides the pulse control signal PWM.

According to the synthetic ripple configuration, the transconductance amplifier 415 generates its output current proportional to the voltage across the output inductor 206, so that the ripple voltage VR applied to ripple capacitance CR and ripple resistance RR replicates or synthetically simulates the ripple current through the output inductor 206. Instead of comparing the ripple voltage to varying window voltages based on a varying control signal, it is instead compared with fixed window voltage based on the fixed control voltage VC.

The remaining portion of the modulator 400 injects output voltage error information into the ripple node 413. As shown, VOUT and VREF are provided to negative and positive inputs, respectively, of a buffer amplifier 401 (e.g., unity gain), having its output provided to a differentiator 403 and to one input of an adder 409. The differentiator 403 includes a capacitor 402 with the ripple capacitance CR, a resistor 407 with the ripple resistance RR, and an amplifier 405. The amplifier 405 is a high gain operational amplifier (op amp) or the like. The capacitor 402 is coupled between the output of the amplifier 401 and the negative input of the amplifier 405, having its positive input coupled to GND. The resistor 407 is coupled between the negative input and output of the amplifier 405, which has its output coupled to the other input of the adder 409. The output of the adder 409 is provided to the positive input of a transconductance amplifier 411 with gain HV/RR, having its negative input coupled to GND. HV is a gain factor. The current output of the transconductance amplifier 411 is injected into the ripple node 413 to adjust the ripple voltage VR with output voltage error information. The differentiator 403 operates to combine the output voltage error information into the ripple node VR while adding a zero to cancel a pole at the ripple node 413.

In the synthetic ripple case, the ripple voltage VR is expressed according to the following equation (3):

$$VR = \frac{GM(VIN - VOUT) - VR/CR}{CR} \approx \frac{RR * GM(VIN - VOUT)}{s * RR * CR + 1} \quad (3)$$

in which "s" is the complex number used in s-domain and Laplace transforms. For the voltage regulator 102 using the modulator 400, the difference between VR and VC may be provided according to the following equation (4):

$$VR - VC = \frac{RR * GM(VIN - VOUT)}{s * RR * CR + 1} - (VOUT - VREF)HV \quad (4)$$

If the control voltage VC is transferred to current into RR*CR, then the right side of equation (4) may be written according to the following expression (5):

$$\frac{RR * GM(VIN - VOUT) - \frac{1}{RR}\left(\frac{s * RR *}{CR + 1}\right)(VOUT - VREF)HV}{s * RR * CR + 1} \quad (5)$$

The synthetic ripple current mode control modulator 400 operates according to the expression (5).

In this manner, the synthetic ripple current mode control modulator 400 employs a control method such that regulator behavior operates in an equivalent manner as that of a conventional synthetic current mode regulator. The synthetic ripple current mode control modulator 400, however, is not limited by the signal range constraints, so that load transient response is improved, noise tolerance is increased, and integrated and adjustable compensation may be facilitated.

Figure 5:
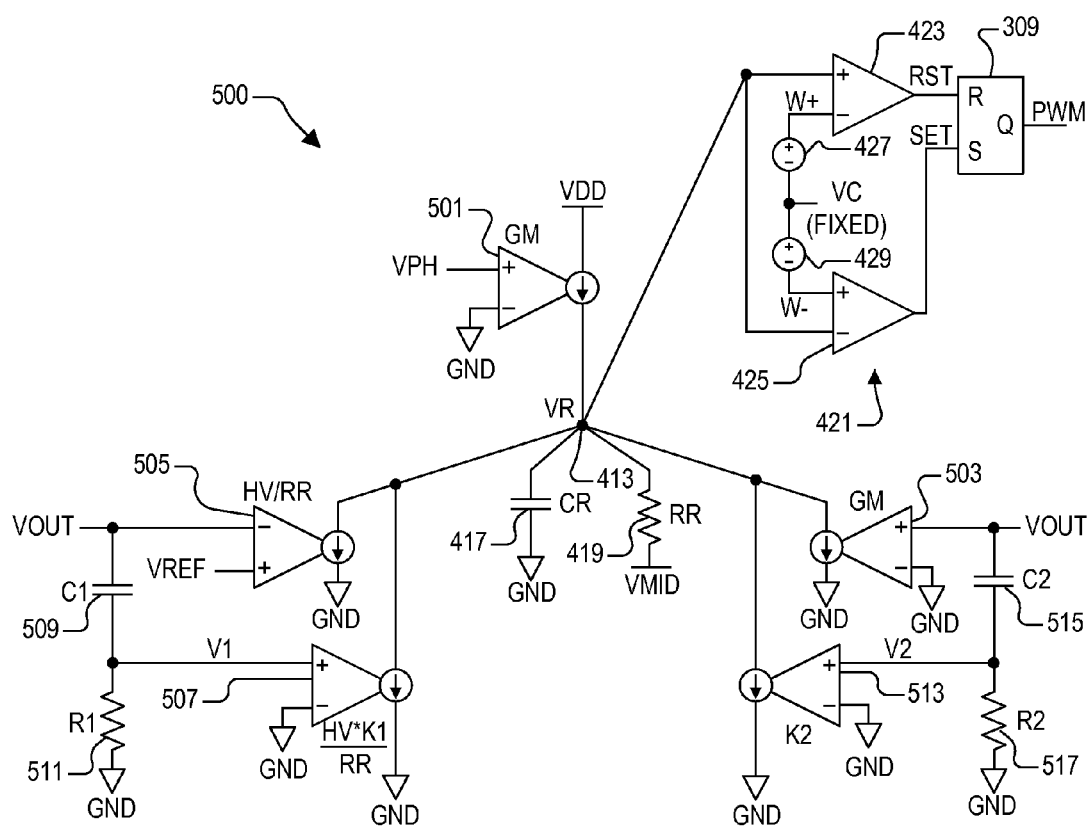
FIG. 5 is a simplified schematic diagram of a hysteretic synthetic control modulator according to another embodiment that may also be used as the modulator for controlling operation of the regulator of FIG. 1.

FIG. 5 is a simplified schematic diagram of a hysteretic synthetic control modulator 500 according to another embodiment that operates similar to the synthetic ripple current mode control modulator 400 in accordance with the expression (5), and that may also be used as the modulator 103 for controlling operation of the regulator 102. The transconductance amplifier 415 of the modulator 400 is split into two separate transconductance amplifiers 501 and 503 for the modulator 500, each having gain "GM" and both having their outputs coupled to the ripple node 413 developing the ripple voltage VR. The transconductance amplifier 501 has VPH at its positive input and GND at its negative input, and the transconductance amplifier 503 receives VOUT at its positive input, and GND at its negative input. The ripple capacitor 417 with ripple capacitance CR and the ripple resistor 419 with ripple resistance RR are both coupled to the ripple node 413 in the same manner.

The transconductance amplifiers 501 and 503 collectively provide inductor current information for the control loop in a synthetic manner as previously described. The amplifier 501 injects a current based on the phase voltage at one end of the output inductor 206, and the amplifier 503 injects a current based on the output voltage at the other end of the output inductor 206. The ripple node 413 is coupled to the hysteretic comparator 421, the voltage sources 427 and 429, and the SR latch 309 in similar manner for developing the PWM signal.

The output voltage error information is injected into the control loop using another transconductance amplifier 505 with gain HV/RR, which receives VOUT at its negative input, which receives VREF at its positive input, and which has its output coupled to the ripple node 413. A pole introduced by RR*CR is canceled by a zero introduced using a transconductance amplifier 507. A capacitor 509 with capacitance C1 and a resistor 511 with resistance R1 are coupled in series between VOUT and GND, forming an intermediate node developing a voltage V1. V1 and GND are provided to the positive and negative inputs, respectively, of the transconductance amplifier 507, having its output injecting a corresponding current into the ripple node 413 to further adjust VR. The transconductance amplifier 507 has a gain HV*K1/RR, in which K1 is a gain factor. The transconductance amplifier 507 provides a zero at K1*R1*C1 to cancel the pole generated by RR*CR.

A capacitor 515 with capacitance C2 and a resistor 517 with resistance R2 are coupled in series between VOUT and GND, forming an intermediate node developing a voltage V2. V2 and GND are provided to the positive and negative inputs, respectively, of another transconductance amplifier 513 having its output injecting a corresponding current into the ripple node 413 to further adjust VR. The transconductance amplifier 513 has a gain based on another gain factor K2. The transconductance amplifier 611 provides another compensation zero, in which K2 controls zero location, in which the added zero is provided for additional compensation for stability and faster transient response.

Simulation results comparing a conventional configuration with a current mode control with combined control signals as described herein reduces regulation error and load release ring back and improves response. A larger window may be used in the hysteretic function to decrease noise sensitivity.

The benefits, features, and advantages of the present invention are now better understood with regard to the foregoing description and accompanying drawings. The foregoing description was presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed. Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. An electronic device, comprising:
    a voltage regulator, comprising:
        a switch circuit that switches voltage applied to an output inductor for converting an input voltage to an output voltage based on a pulse control signal; and
        a modulator for controlling said switch circuit, comprising:
            a sense circuit that provides a current sense signal indicative of current through said output inductor;
            a ramp circuit that develops a ramp voltage on a ramp node using said current sense signal;
            an error circuit that develops an error signal indicative of output voltage error and that injects said error signal into said ramp node to adjust said ramp voltage;
            a comparator circuit that compares said ramp voltage with a fixed control voltage to develop a compare signal; and
            a logic circuit that uses said compare signal to develop said pulse control signal.

2. The electronic device of claim 1, wherein:
    said sense circuit comprises a current sensor circuit that provides a sense current indicative of current through said inductor;
    wherein said ramp circuit comprises a resistive device coupled to said ramp node, in which said sense current is injected into said resistive device via said ramp node to develop said ramp voltage; and
    wherein said logic circuit uses said compare signal and a fixed clock signal to develop said pulse control signal.

3. The electronic device of claim 1, wherein said error circuit comprises a transconductance amplifier that injects an error current signal based on a difference between a voltage indicative of said output voltage and a reference voltage indicative of a target level of said output voltage.

4. The electronic device of claim 3, wherein said transconductance amplifier has a gain based on a resistance of said resistive device.

5. The electronic device of claim 2, wherein said ramp circuit and said error circuit are configured according to an expression:

$$\left[ILS - \frac{(VREF - VOUT)(HV)}{RI}\right]RI$$

in which ILS comprises said sense current indicative of current through said output inductor, VREF is a reference voltage indicative of a target level of said output voltage VOUT, HV is a gain factor and RI is a resistance of said resistive device.

6. The electronic device of claim 1, wherein said sense circuit and said ramp circuit comprise:
    a transconductance circuit that converts voltage applied across said output inductor into a sense current applied to said ramp node which comprises a ripple node; and
    a ripple capacitor and a ripple resistor both coupled to said ripple node, in which said ramp node develops a ripple voltage that synthetically replicates ripple current through said output inductor.

7. The electronic device of claim 6, wherein said error circuit comprises:
    a buffer amplifier having an output that provides a voltage indicative of output voltage error;
    a differentiator, comprising:
        an operational amplifier having a first input coupled to ground, having a second input and having an output;
        a second ripple capacitor coupled between said output of said buffer amplifier and said second input of said operational amplifier; and
        a second ripple resistor coupled between said second input and said output of said operational amplifier;
    an adder having a first input coupled to said output of said buffer amplifier, having a second input coupled to said output of said operational amplifier, and having an output; and
    a transconductance amplifier having an input coupled to said output of said adder, having a gain based on a resistance of said ripple resistor, and having an output injecting a current into said ripple node.

8. The electronic device of claim 6, wherein said transconductance circuit comprises:
    a first transconductance amplifier having a first input coupled to the output inductor, a second input coupled to ground, and an output providing a first current to said ramp node; and
    a second transconductance amplifier having a first input receiving said output voltage, a second input coupled to ground, and an output providing a second current to said ramp node.

9. The electronic device of claim 6, wherein said error circuit comprises:
    a first transconductance amplifier having a gain based on a resistance of said ripple resistor, wherein said first transconductance amplifier has a first input receiving a voltage indicative of said output voltage, a second input receiving a reference voltage indicative of a target voltage level of said output voltage, and an output injecting an error current into said ripple node.

10. The electronic device of claim 9, further comprising:
    a first capacitor and a first resistor coupled in series between said output voltage and ground forming a first intermediate node; and
    a second transconductance amplifier having a gain based on a resistance of said ripple capacitor, having a first input coupled to said first intermediate node, having a second input coupled to ground, and having an output injecting a first pole canceling current into said ripple node.

11. The electronic device of claim 10, further comprising:
a second capacitor and a second resistor coupled in series between said output voltage and ground forming a second intermediate node;
a third transconductance amplifier having a first input coupled to said second intermediate node, having a second input coupled to ground, and having an output injecting a second pole canceling current into said ripple node.

12. The electronic device of claim 6, wherein:
said comparator circuit comprises:
a first comparator that compares said ripple voltage with a fixed upper window voltage and which provides a reset signal; and
a second comparator that compares said ripple voltage with a fixed lower window voltage and which provides a set signal; and
wherein said logic circuit receives said set and reset signals for developing said pulse control signal.

13. The electronic device of claim 6, wherein said modulator operates according to an expression:

$$\frac{RR*GM(VIN-VOUT)-\frac{1}{RR}\left(\frac{s*RR*}{CR+1}\right)(VOUT-VREF)HV}{s*RR*CR+1}$$

in which RR comprises a resistance of said ripple resistor, GM is a transconductance gain of said transconductance circuit, VIN is said input voltage, VREF is a reference voltage indicative of a target level of said output voltage VOUT, HV is a gain factor of said error amplifier, CR is a capacitance of said ripple capacitor, and s is an s-domain complex number.

14. The electronic device of claim 1, further comprising a processor and a memory coupled to said voltage regulator.

15. A method of regulating voltage, comprising:
switching voltage applied to an output inductor for converting an input voltage to an output voltage based on a pulse control signal;
providing a current sense signal indicative of current through the output inductor;
developing a ramp voltage on a ramp node using the current sense signal;
developing an error signal indicative of output voltage error and injecting the error signal into the ramp node to adjust the ramp voltage;
comparing the ramp voltage with a fixed control voltage to develop a compare signal; and
using the compare signal to develop the pulse control signal.

16. The method of claim 15, wherein:
said providing a current sense signal comprises sensing current through the output inductor and providing a sense current;
wherein said developing a ramp voltage comprises applying the sense current through a resistive device coupled to the ramp node; and
wherein said using the compare signal comprises toggling the pulse control signal based on the compare signal and a fixed clock signal.

17. The method of claim 16, wherein said developing an error signal comprises generating an error current signal based on a difference between a signal indicative of the output voltage and a reference voltage indicative of a target level of the output voltage and a gain factor based on a resistance of the resistive device.

18. The method of claim 15, wherein said providing a current sense signal and said developing a ramp voltage comprises converting voltage applied across the output inductor into a sense current applied to the ramp node comprising a ripple node which is coupled to a ripple resistance and a ripple capacitance and which develops a ripple voltage that synthetically replicates ripple current through the output inductor.

19. The method of claim 18, wherein said developing an error signal comprises generating an error current signal based on a difference between a signal indicative of the output voltage and a reference voltage indicative of a target level of the output voltage and a gain factor based on the ripple resistance.

20. The method of claim 19, further comprising generating a zero canceling current based the ripple resistance and injecting the zero canceling current into the ripple node.

* * * * *